Patented May 12, 1953

2,638,458

UNITED STATES PATENT OFFICE 2,638,458

HYDROGENATED PHENOLIC RESIN ESTERS

Donald H. Wheeler, Minneapolis, Minn., assignor to General Mills, Inc., a corporation of Delaware No Drawing. Application May 4, 1950, Serial No. 160,094

8 Claims. (Cl. 260—19)

The present invention relates to esters of hydrogenated phenol formaldehyde resins.

The esters of the present invention are derived from hydrogenated phenol formaldehyde resins of a particular type, as will be described more fully hereinafter. These resins are esterified with higher unsaturated fatty acids derived from drying oils or semi-drying oils, such as linseed and soybean oil acids. The hydrogenated phenol formaldehyde resins themselves may be water-white and crystal-clear and the esters produced from these resins may be colorless, depending upon the color of the fatty acids used for esterification. The esters dry to hard, tough, resilient films, the rate of drying being dependent upon the degree of unsaturation of the higher fatty acid employed for esterification.

It is an object of the present invention to provide higher unsaturated fatty acid esters of hydrogenated phenol formaldehyde resins of a particular type, the esters being in the nature of drying oils and being capable of drying to hard, tough, resilient films.

The hydrogenated phenol formaldehyde resins used for esterification in the present invention are those containing an average of from about 4 to about 10 hydrogenated phenol groups in the resin molecule. The resins are preferably substantially free from methylol groups, or at most contain only a few such groups, thereby avoiding any substantial condensation of the resin during subsequent treatments. Resins of the above type may be made by adding formaldehyde to a phenol containing an acid catalyst, and then carrying out the usual acid catalyzed condensation. After the condensation is completed, the resin may be cooled under nitrogen, in which event it may be made water-white and crystal-clear.

Resins prepared from phenol itself and containing from about 4 to about 10 phenolic groups per molecule may be made by employing a ratio of from 2 to 3 moles of formaldehyde per 4 moles of phenol. These ratios permit control of the resin size to that above stated. The invention is also applicable to substituted phenols, particularly phenols substituted with aliphatic hydrocarbon groups containing from 1 to 9 carbon atoms. Typical of these substituted phenols are the cresols, ortho-, meta-, and para-; p-tert-butyl phenol, and nonyl phenol. Where the substituent is on the ortho- or para- position the above limitation of reactant ratios is not necessary inasmuch as such resins are linear and can be controlled to the desired molecular size by control of the reaction conditions, including time, temperature, and catalyst.

The resin reaction can be catalyzed by mild acid conditions such as those obtained by the use of acetic acid or similar acids as the catalyst results in a resin which esterifies at a greater rate and which possesses greater solubility in solvents, or they can be catalyzed by strong acids such as hydrochloric and sulfuric which produce resins characterized by a slower rate of esterification and by a lower solubility in the usual solvents. The mild acid catalyzed resins are therefore preferred. The process is simple and inexpensive to conduct, and bis and tris compounds and any excess phenol may be readily removed by simply distilling them from the resin reaction mixture.

The resins described above may be hydrogenated by simply dissolving the resin in a suitable solvent, adding a hydrogenation catalyst such as Raney nickel, and subjecting the solution to hydrogen at an elevated pressure and at an elevated temperature.

For the hydrogenation temperatures in the range of 150–200° C., pressures of from 500–4000 pounds, and time periods of from 6–20 hours are satisfactory. It is difficult to determine the extent to which the aromatic unsaturation is removed by the hydrogenation, but based on changes in ultra-violet light absorption, as will be seen in the examples, the hydrogenation may proceed to an extent of 80% or more. From a theoretical standpoint, it would appear that the hydrogenated resin could contain a mixture of cycloaliphatic rings and of benzene rings inasmuch as any benzene ring which is hydrogenated at all should be hydrogenated completely.

The hydrogenated resins described immediately above may be esterified with fatty acids of the drying or semi-drying type. These acids may be the mixed acids of a drying or semi-drying oil such as the mixed acids of soybean oil, linseed oil, tung oil, perilla oil, oiticica oil, and the like. They may likewise be selected fractions of such oils and may be isolated individual fatty acids of such oils which have a drying or semi-drying characteristic. Even the oleic acid esters of these resins are capable of drying tack free over extended periods of time. The time period involved, however, is usually longer than that desired in a commercial product. In general, a minimum iodine number of 100 is desirable and preferably an iodine number in excess of 110.

The esterification may be carried out by simply heating the hydrogenated resins with fatty acids in the absence of a catalyst at temperatures in excess of 200° C., preferably from 230–250° C., or in the presence of an esterification catalyst at temperatures in the range of 200–250° C. The time periods involved for esterification vary widely with the resin, with the degree of esterification desired, and on whether or not a catalyst is employed. In the absence of a catalyst, time periods of 18–24 hours may be required for about 60% esterification. With zinc stearate as a catalyst the time period may be lowered to from 8–12 hours even for 80% esterification. With other catalysts, such as boric acid anhydride, $B_2O_3$, the time period may be material reduced even to about 4 hours for approximately 60% esterification.

The extent to which the hydrogenated resins may be esterified is subject to considerable variation. Inasmuch as the free hydroxyl groups remaining on an incompletely esterified resin are essentially aliphatic hydroxyl groups, there is no material problem of color stability, and accordingly it is not necessary that these hydroxyl groups be esterified in order to obtain a color stable product as is the case with the unhydrogenated resins. The same is essentially true of the alkali stability of the hydrogenated resins. The changes in the resin ester and the degree of esterification are largely the following: At low degrees of esterification, such as for example 20%, the resin esters are solids and may be applied as coatings from a solution. Upon the evaporation of the solvent a hard film is immediately deposited and there is very little increase in hardness resulting from the oxidation of the unsaturated fatty acid group. In this type of product the fatty acid groups serve largely as plasticizing groups. At high degrees of esterification, for example 40–60%, the resin esters are liquid and may be applied as coatings in a liquid state. They dry to hard films as a result of oxidation. At higher degrees of esterification, from 80–100%, the drying function of the ester is of paramount importance, and the phenol formaldehyde resin portion of the molecule essentially contributes hardness to the resultant film. The invention therefore contemplates esters ranging in degree of esterification from 20% to 100%.

The esters of the hydrogenated phenol formaldehyde resins which have a degree of esterification of 40% or more have excellent drying rates and produce films of excellent hardness and water and alkali resistance. The rates of esterification with the unsaturated higher fatty acids are higher in the case of the hydrogenated resins than is the case with the unhydrogenated resins. The same is true of the drying rate and the hardness of the resultant films.

The following examples will serve to illustrate the invention:

Example 1

769 cc. (9½ moles) of formalin were added over a period of four and one-half hours to 1504 g. of phenol (16 moles) and 4 g. of oxalic acid. Refluxing was continued for ten hours, after which the product was subjected to evaporation and was then stripped at a pressure of one-half mm. until the pot temperature reached 300° C. and the vapor temperature at 230° C. The distillate weighed 215 g., while the residue weighed 1085 g. The molecular weight of the residue was 618, had a melting point of 102–107° C., and contained carbon, 78.52%, and hydrogen, 6.29%.

150 g. of the above phenol formaldehyde resin were dissolved in 250 cc. of butanol. A Raney nickel catalyst was added, and the mixture was hydrogenated for 7 hours 45 minutes at 1500 pounds pressure at about 170° C. The product was filtered and subjected to evaporation to yield a product weighing 147 g., melting at 134–140° C., and having a maximum ultra-violet light absorption at λ282 of 5.4 as compared with an absorption of 22.9 for the original resin. The hydrogenated resin contained 76.17% carbon and 10.14% hydrogen. The hydroxyl number calculated from the carbon and hydrogen was 480.6.

100 g. of the above resin, 214 g. of mixed soybean oil fatty acids, 4 g. of zinc stearate and 50 cc. of xylene were refluxed and agitated under a Stark and Dean tube for 11 hours at 235–240° C. The theoretical quantity of water required for complete esterification was distilled off. The product was subjected to evaporation and then was stripped at a temperature up to 255° C. at a pressure of 40 microns. The distillate weighed 21 g., while the residue weighed 284 g. and had an $n_D^{30}$ 1.5003, an acid number of 5.6, a hydroxyl number of 15.7, and a viscosity of Z4–Z5.

Example 2

243 cc. (3 moles) formalin were added drop by drop over a period of 2 hours to 374 g. of phenol and 1 cc. of concentrated hydrochloric acid. Refluxing and agitation were continued for a period of 4 hours. The reaction mixture was subjected to evaporation and was then distilled at a temperature of 290° C. at a pressure of 10 microns. The residue weighed 345 g., had a molecular weight of 950, a melting point of 122–132° C., and contained approximately 78.5% carbon, and about 6% hydrogen.

185 g. of the above phenol formaldehyde resin were dissolved in 250 cc. of butanol and a Raney nickel catalyst was added, and the mixture subjected to hydrogenation for 21 hours at 180° C. and 2500 pounds pressure. The product weighed 184 g., and contained 76.62% carbon, and 10.12% hydrogen (theoretical hydrogen for complete hydrogenated resin 11.46%). The product had an ultra-violet absorption maximum of 4.8 as compared with a maximum for the unhydrogenated resin of 22.5.

56 g. of the above hydrogenated resin, 2 g. of zinc stearate, 140 g. of the mixed fatty acids of soybean oil, and 45 cc. of xylene were refluxed and agitated under a Stark and Dean tube for 23 hours at 240° C. The product was evaporated and then stripped at 250° C. at 50 microns pressure. The distillate weighed 31.5 g., the residue 159 g. The residue had an $n_D^{30}$ 1.5030, an acid number of 15.0, and a hydroxyl number of 30.2. The product was made into a 50% solution in mineral spirits, which was mixed with a cobalt drier and the resultant product applied to plates and tubes. The product dried to no transfer in 50 minutes; it was tack free to foil in 2 hours and 50 minutes; and had a 24 hour Rocker hardness of 12, 48 hour Rocker hardness of 20, and a 72 hour Rocker hardness of 22. The films passed the hot and cold water tests (3 days in cold water, 2 hours in boiling water) and the ⅛" mandrel test.

Example 3

107 g. of the hydrogenated resin of Example 2, 215 g. of mixed soybean oil acids, 15 g. of phthalic anhydride, and 50 cc. xylene were refluxed and agitated under a Stark and Dean tube for 12 hours at 243° C. The product was evaporated and then stripped to a temperature of 270° C. at 300 microns pressure. The distillate weighed 71 g., the residue 242 g. The residue had an acid number of 8:7. A 50% solution of the residue in xylene was made, a cobalt drier was added, and the resultant product applied to tubes and plates. The films dried through in 30 minutes and were tack free to foil in 56 minutes. Rocker hardness after 24 hours was 14; after 72 hours it was 14. The films passed the hot and cold water tests, were unaffected by 5% NaOH (24 hours), and were flexible under the 1/8" mandrel tests.

*Example 4*

648 cc. of formalin (8 moles) were added over a period of three hours to 1504 g. of phenol and 4 g. of oxalic acid. The mixture was refluxed and agitated for a period of 10 hours, after which the product was evaporated, then stripped to 305° C. at 150 microns. The distillate weighed 278 g., the residue weighed 892 g. and had a melting point of 89–95° C. The carbon content was 78.54%, the hydrogen was 6.09%.

200 g. of the above phenol formaldehyde resin were dissolved in 250 cc. of butanol, and a Raney nickel catalyst was added. The mixture was hydrogenated for 15 hours at 180° C. at 2500 pounds pressure. The yield amounted to 205 g. having a melting point of 117–123° C. and having a carbon content of 75.35%, hydrogen 10.05%. The maximum ultra-violet absorption was 3.6.

55 g. of the above hydrogenated resin, 140 g. of mixed soybean oil acids, 1 g. of oxalic acid (anhydrous) and 40 cc. of xylene were refluxed and agitated under a Stark and Dean tube for 16 hours at 235–247° C. The product was evaporated and then stripped to a temperature of 255° C. at 350 microns. The distillate weighed 33 g.; the residue weighed 153.5 g. and had an $n_D^{30}$ 1.4983. The viscosity of the product was Z–1, the acid number 11.3, the hydroxyl number 0. An 80% solution of the product in mineral spirits was mixed with a cobalt drier and applied on plates and tubes. The product was tack free to foil overnight and passed a hot and cold water test.

*Example 5*

55 g. of the hydrogenated resin of Example 4, 7.5 g. of phthalic anhydride and 112 g. of mixed soybean oil fatty acids, and 45 cc. of xylene were refluxed and agitated under a Stark and Dean tube for 14 hours at 235–240° C. The product was evaporated and stripped to a temperature of 258° C. at 10 mm. The residue weighed 148 g. and had an $n_D^{30}$ of 1.5000, an acid number of 6.2, a hydroxyl number of 0 and a viscosity of Z–3. An 80% solution of the product in mineral spirits was mixed with a cobalt drier and applied on tubes and plates. The product dried to no transfer in 2 hours and 20 minutes and passed the hot and cold water test. It failed slightly in 5% NaOH in 3½ hours.

*Example 6*

53 g. of the hydrogenated resin of Example 4, 84 g. of the mixed soybean oil fatty acids; 30 g. phthalic anhydride; and 45 cc. of xylene were refluxed and agitated under a Stark and Dean tube for 9 hours at 225–240° C. The product was evaporated and then stripped to a temperature of 260° C. at 30 microns. The residue weighed 123 g., had an $n_D^{30}$ 1.5064, an acid number of 5.0, a hydroxyl number of 1.1, and a viscosity of Z–6. A 70% solution of the product in mineral spirits was mixed with a cobalt drier and applied on plates and tubes. The Rocker hardness in 5 days was 10. The product dried to a no transfer point in 3 hours, and was tack free to foil in less than 18 hours. It passed the hot and cold water test and the 5% sodium hydroxide test.

*Example 7*

891 cc. of formalin (11 moles) were added during a period of 2½ hours to 1504 g. of phenol and 4 g. of oxalic acid. The mixture was refluxed and agitated for a period of 10 hours, after which the mixture was evaporated, and stripped to 300° C. at 80 microns. The distillate weighed 155 g.; the residue, 1250 g. The residue had a melting point of 112–116° C., a carbon content of 77.32%, and a hydrogen content of 5.60%.

200 g. of the above resin were dissolved in 250 cc. of butanol and a Raney nickel catalyst was added. The mixture was hydrogenated for 21 hours at 180° C. at 2500 pounds pressure. The product weighed 202 g., had a melting point of 150–158° C., and a carbon content of 76.55%, a hydrogen content of 9.76%. The ultra-violet absorption maximum was 4.9.

55 g. of the above hydrogenated resin, 140 g. of the mixed soybean oil fatty acids, 1 g. of anhydrous oxalic acid, and 40 cc. xylene were agitated and refluxed under a Stark and Dean tube for 15 hours at 235–250° C. The product was then evaporated and stripped to a temperature of 250° C. at 10 microns. The distillate weighed 43 g.; the residue 145 g. The acid number of the residue was 5.7, the hydroxyl number 0.5, and the viscosity was slower than Z–6. A 70% solution of the product in mineral spirits was mixed with a cobalt drier and applied on plates and tubes. The product reached the no transfer stage in 2½ hours; a Rocker hardness of 16 in 4 days, and passed the hot and cold water tests and the 5% NaOH test.

*Example 8*

810 cc. of formalin (10 moles) were added over a period of 2½ hours to 1504 g. of phenol and 4 g. of oxalic acid. The mixture was then agitated and refluxed for 10 hours, after which it was evaporated and then stripped to a temperature of 300° C. at 50 microns. The distillate weighed 230 g.; the residue 1172 g. The melting point of the residue was 96–100° C., the molecular weight 901, per cent carbon 79.14, per cent hydrogen 6.10.

200 g. of the above resin were dissolved in 300 cc. of butanol. A Raney nickel catalyst was added and the mixture hydrogenated for 15 hours at 180° C. at 2350 pounds pressure. The product weighed 204 g., had a melting point of 128–135° C., per cent carbon 75.97, per cent hydrogen 9.70, ultra-violet absorption maximum 4.3.

55 g. of the above hydrogenated resin, 140 g. of soybean oil fatty acids, 1 g. of oxalic acid and 40 cc. of xylene were refluxed and agitated under a Stark and Dean tube for 15 hours at 240° C. The mixture was evaporated and stripped to 250° C. at 60 microns. The distillate weighed 38 g., the residue 137 g. The residue had an $n_D^{27}$ 1.5019, an acid number 3.2, hydroxyl number 13.8, 12.1, viscosity Z–4 to Z–5. An 80% solution of the product in mineral spirits was mixed with a cobalt drier and applied on plates and tubes. Rocker hardness in 5 days was 10. The films passed the hot and cold water test, the 5% NaOH test, and the mandrel test.

*Example 9*

900 g. of p-tert-butyl phenol, 900 cc. of formalin, 10 cc. of hydrochloric acid were agitated and refluxed for 22 hours. The aqueous layer amounting to 700 cc. was drawn off. The balance was dissolved in benzene, and the benzene solution washed with water, dried over sodium sulfate, filtered, and evaporated in vacuo yielding 955 g. of a product having a molecular weight of 704 to 741 and a melting point of 130–133° C.

162 g. of the above resin were dissolved in butanol to produce a total volume of solution of 400 cc. A Raney nickel catalyst was then added and the mixture hydrogenated for 12½ hours at 2400 pounds pressure at a temperature of 180° C. The product was evaporated yielding 146 g. of a pale straw resin melting at 142–146° C., and a molecular weight of 1035.

134.5 g. of the above hydrogenated resin, 134.5 g. of soybean oil fatty acids, 0.7 g. of lead stearate, and 50 cc. of xylene were agitated and refluxed at 235° C. for 21½ hours. The product was then evaporated and stripped to a temperature of 235° C. at 35 microns. The distillate weighed 31 g., the residue, 227 g. The residue had a hydroxyl number of 17.1, an acid number of 17.2, a gel time of approximately 11 minutes. The product gave a completely dry film at room temperature in 50 minutes.

*Example 10*

The p-tert-butyl phenol formaldehyde resin of Example 9 was hydrogenated as described in that example except that the hydrogenation was carried on for 18 hours. This resulted in a product weighing 149 g., having a melting point of 136–140° C., and a molecular weight of 910.

130 g. of the above hydrogenated resin, 130 g. of linseed oil fatty acids, and 50 cc. xylene were agitated and refluxed at 235° C. under a Stark and Dean tube for 66 hours. The product was evaporated and then stripped to 235° C. at 10 microns. 21 g. of material distilled over, leaving a residue weighing 226 g. and having an $n_D^{30}$ 1.5168, a hydroxyl number of 12.5, an acid number of 16.1, a gel time of 480–500 seconds. The product when mixed with a drier dried in 10 minutes at room temperature to a nice film.

*Example 11*

The p-tert-butyl phenol formaldehyde resin of Example 9 was hydrogenated as disclosed in that example except that the time period was 16½ hours. The yield was 145 g. of a product melting at 139–142.5 C., and with a molecular weight of 860.

132 g. of the above resin, 136 g. of the fatty acid fraction of tall oil and 50 cc. of xylene were stirred and refluxed at 235° C. for 66 hours. The product was evaporated and then stripped to a temperature of 250° C. at 50 microns. The distillate weighed 43 g., the residue 214 g. The residue had an $n_D^{30}$ 1.5178, a hydroxyl number of 24, an acid number of 11.5, and gel time 715–750 seconds. When the product was mixed with a drier and spread, the product dried in 20 minutes at room temperature.

I claim as my invention:

1. An ester of a hydrogenated phenol formaldehyde resin, said resin containing before hydrogenation an average of from about 4 to about 10 phenolic groups per molecule, the hydroxyl groups of the resin being esterified at least partially by means of an unsaturated higher fatty acid ester having at least semi-drying characteristics.

2. An ester of a hydrogenated phenol formaldehyde resin, said resin containing before hydrogenation an average of from about 4 to about 10 phenolic groups per molecule, the hydroxyl groups of the resin being at least partially esterified with the mixed acids of soybean oil.

3. An ester of a hydrogenated phenol formaldehyde resin, said resin containing before hydrogenation an average of from about 4 to about 10 phenolic groups per molecule, the hydroxyl groups of the resin being at least partially esterified with the mixed acids of linseed oil.

4. An ester of a hydrogenated phenol formaldehyde resin, said resin containing before hydrogenation an average of from about 4 to about 10 phenolic groups per molecule, the hydroxyl groups of the resin being esterified at least about 60% by means of an unsaturated higher fatty acid having at least semi-drying characteristics.

5. An ester of a hydrogenated phenol formaldehyde resin, said resin containing before hydrogenation an average of from about 4 to about 10 phenolic groups per molecule, the hydroxyl groups of the resin being esterified at least about 60% by means of the mixed acids of soybean oil.

6. An ester of a hydrogenated phenol formaldehyde resin, said resin containing before hydrogenation an average of from about 4 to about 10 phenolic groups per molecule, the hydroxyl groups of the resin being esterified at least about 60% by means of the mixed acids of linseed oil.

7. An ester of a hydrogenated phenol formaldehyde resin, said resin containing before hydrogenation an average of from about 4 to about 10 phenolic groups per molecule, the hydroxyl groups of the resin being substantially completely esterified by means of an unsaturated higher fatty acid having at least semi-drying characteristics.

8. An ester of a hydrogenated phenol formaldehyde resin, said resin containing before hydrogenation an average of from about 4 to about 10 phenolic groups per molecule, the hydroxyl groups of the resin being substantially completely esterified by means of an unsaturated higher fatty acid having at least semi-drying characteristics, the product being substantially free of phenol and phenol formaldehyde reaction products having less than 3 phenolic groups per molecule.

DONALD H. WHEELER.

References Cited in the file of this patent

UNITED STATES PATENTS

| Number | Name | Date |
|---|---|---|
| 2,072,143 | Ubben | Mar. 2, 1937 |
| 2,365,121 | Traylor | Dec. 12, 1944 |
| 2,413,412 | Mazzucchelli | Dec. 31, 1946 |
| 2,506,903 | Smith et al. | May 9, 1950 |
| 2,544,365 | Sorenson | Mar. 6, 1951 |